(12) United States Patent
Buhariwala et al.

(10) Patent No.: US 12,197,501 B2
(45) Date of Patent: Jan. 14, 2025

(54) HISTORICAL DATA-BASED VIDEO CATEGORIZER

(71) Applicant: Microsoft Technology Licensing, LLC, Redmond, WA (US)

(72) Inventors: Karl Porus Buhariwala, Sammamish, WA (US); Srinivasan Sundaramoorthy, Redmond, WA (US); Ramya Narasimha, Bellevue, WA (US); Minghan Chen, Lynnwood, WA (US); Ganesh Sheshrao More, Bellevue, WA (US); Ganga Narayanan, Kirkland, WA (US); Michael Paul Gilkenson, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/326,687

(22) Filed: May 31, 2023

(65) Prior Publication Data

US 2024/0403363 A1    Dec. 5, 2024

(51) Int. Cl.
G06F 16/75    (2019.01)
G06F 16/735    (2019.01)
G06N 20/00    (2019.01)

(52) U.S. Cl.
CPC ............ *G06F 16/75* (2019.01); *G06F 16/735* (2019.01); *G06N 20/00* (2019.01)

(58) Field of Classification Search
CPC ........ G06F 16/75; G06F 16/375; G06N 20/00
See application file for complete search history.

(56) References Cited

U.S. PATENT DOCUMENTS

| 2011/0047163 A1 | 2/2011 | Chechik et al. |
| 2015/0286718 A1 | 10/2015 | Wang et al. |
| 2021/0110166 A1 | 4/2021 | Gunawardena |

(Continued)

FOREIGN PATENT DOCUMENTS

WO    2017124116 A1    7/2017

OTHER PUBLICATIONS

Southern, Matt G., "Google is Reportedly Adding Timestamps to YouTube Videos in Search Results", Retrieved from: https://www.searchenginejournal.com/google-is-reportedly-adding-timestamps-to-youtube-videos-in-search-results/312839/#close, Jun. 17, 2019, 4 Pages.

(Continued)

*Primary Examiner* — Loc Tran
(74) *Attorney, Agent, or Firm* — Holzer Patel Drennan

(57) ABSTRACT

Instrumenting of a video is provided, including determining a query topic based on the content of a received query, semantically searching a video metadata repository for category-based video metadata associated with a first category, and returning the category-based video metadata associated with the first category based on the semantic searching. The first category is semantically associated with the query topic and is one of a plurality of categories that a machine learning model is configured to output responsive to the input of video data representing video content. The machine learning model was trained based on inputting training data, including historical use training data associated with each of the plurality of categories into the machine learning model.

22 Claims, 6 Drawing Sheets

(56) References Cited

U.S. PATENT DOCUMENTS

2021/0350251 A1* 11/2021 Lewis .................... G06N 20/00
2022/0122357 A1*  4/2022 Zhao ...................... G06V 10/82
2022/0321970 A1* 10/2022 Swanson ................ G06V 20/46

OTHER PUBLICATIONS

International Search Report and Written Opinion received for PCT Application No. PCT/US2024/030160, Jul. 31, 2024, 13 pages.

* cited by examiner

HISTORICAL DATA-BASED VIDEO CATEGORIZER

BACKGROUND

Services often include technical support pages with information to help a user can address an issue without consulting a technical support specialist of the service. Technical support from a live technical support specialist is a limited resource that is often expensive and overburdened. Providing users with effective support pages can reduce the problems for which users need to consult live support specialists. Videos are excellent sources of technical support information, and including videos on support pages provides relatable technical support to users and reduces the number of users who contact live support. However, many videos contain more information than a user needs to address a problem, and the user is often unwilling to search for relevant subject matter or wait for it to appear onscreen during a long video.

SUMMARY

The presently disclosed technology instruments a video by determining a query topic based on the content of a received query, semantically searching a video metadata repository for category-based video metadata associated with a first category, and returning the category-based video metadata associated with the first category based on the semantic searching. The first category is semantically associated with the query topic and is one of a plurality of categories that a machine learning model is configured to output responsive to input of video data representing video content. The machine learning model was trained based on inputting training data, including historical use training data associated with each of the plurality of categories into the machine learning model.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Figure 1:
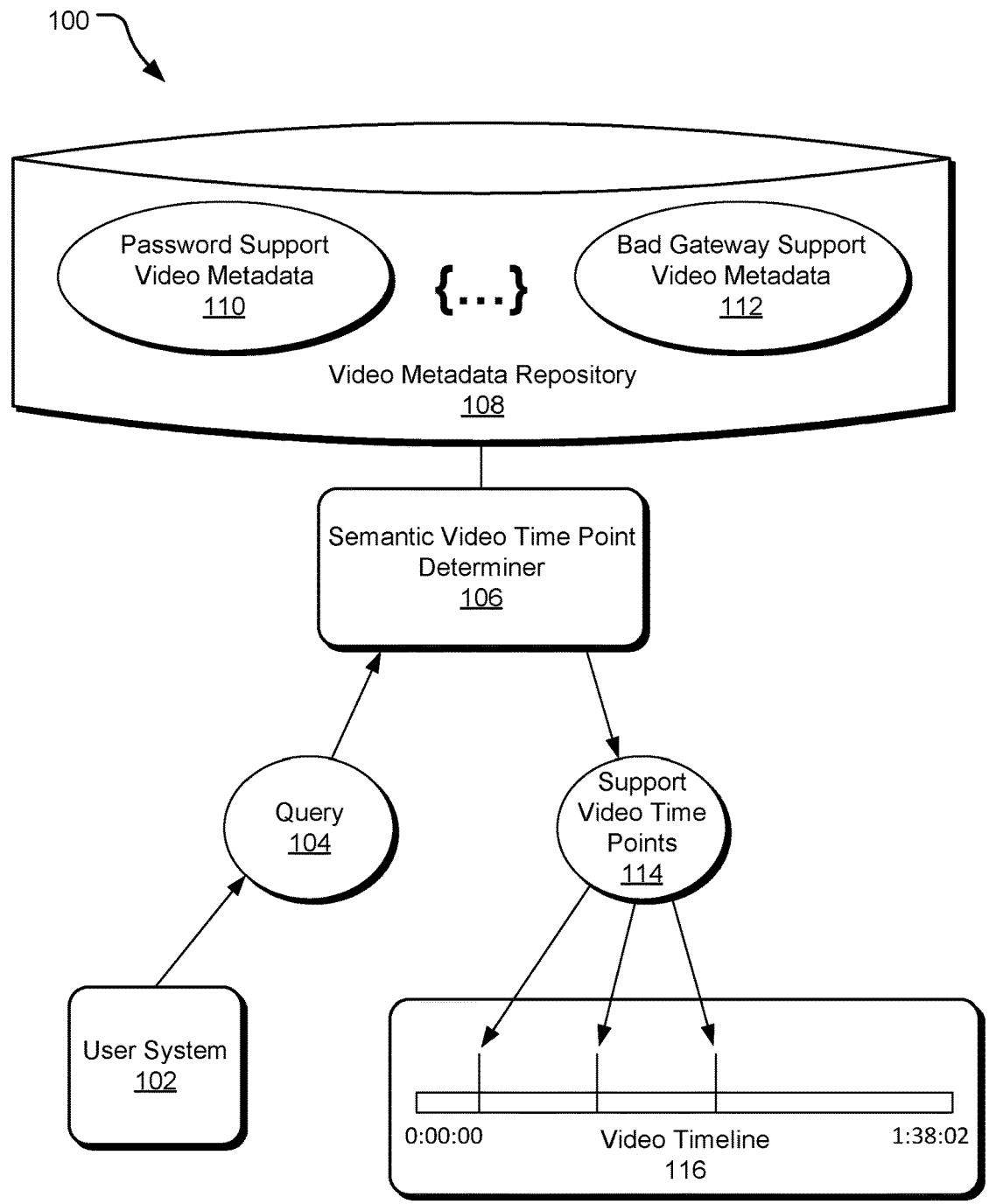
FIG. 1 illustrates an example system for responding to a query with a video time point.

Providing informative videos on technical support pages can ease the burdens on live technical support teams. However, providing long videos with superfluous information immaterial to addressing user concerns confuses users and tests the users' patience. Many users resort to contacting live support help if the users are unable to quickly find a solution to a problem in a provided video. This is also an issue in service contexts other than technical support in which content writers for a service provide information intended to reduce user reliance on live support resources. For example, if a travel agency webpage directs a consumer to a video that discusses many destinations, and the user is only interested in information about Mexico, the user may be unwilling to wait or search for a segment about Mexican vacations within the long video.

A solution is to instrument videos to direct users to time points in the videos relevant to the information users seek. In the support context, rather than directing a user to the beginning of a long video that addresses many technical support topics, a support page can provide links to points in the long video that address the root cause of a problem. Directed video solutions limit a user's need to consult live technical support services. However, determining the relevant video time points for multiple videos across multiple support categories can be a time-consuming and difficult task for service content creators. Without automation, manual searching of a video for a time point that addresses a particular category of information is a slow process. For example, in the support context, discovering a time point in a video where password reset support is addressed involves scouring the video or a transcript of the video to find a video time point in the video with relevant password reset support information.

The presently disclosed technology includes a system that automatically analyzes video data representing the content of a video to determine the categories of information that are addressed at different video time points in the video. The technology includes an artificial intelligence-driven video categorizer that receives the video data and responsively outputs predefined categories of information presented in the video. For example, in the support context, an example video addresses how to log in to a site and how to change a password. Rather than manually searching the video for information about a support category, a technical support page creator can input video data of the video into a historical use data-based video categorizer. The video categorizer is an artificial intelligence model that is trained using historical use training data. The historical use training data includes data representing historical interactions of a user with a service. Relying on the artificial intelligence framework, the video categorizer outputs data representing categories of information addressed in the input video data, such as the categories of "login help" and "password help." In implementations, the system or service content creator then inputs the video data and the data representing categories into a video time point determiner. The video time point determiner responsively outputs video time points in the video at which the categories of information are addressed.

The video time points can then be used to generate links to instrument a video to begin playback at the time points associated with the categories. These links, presented on pages or used to present the video in a video player, provide a user with the video at a video time point relevant to the categories represented in the output of the video categorizer. For example, in the support context, a video at a time point associated with login help or a link thereto can be presented on a support page for login help. Users select the presented video player or link, and the system instruments the video to advance the video to begin playback at the time point associated with "login help."

The system automates the otherwise time-consuming process of determining video time points that are relevant to predefined categories of information using artificial intelligence. The system saves a service content creator (e.g., the author of an information page) significant time. The system also provides effective video time points that will enhance a user's experience on an information page and make the user less likely to contact a live operator.

FIG. 1 illustrates an example system 100 for responding to a query 104 with video time points 114. The system 100 provides category-based video metadata, including video time points 114 in response to the query 104 from a user system 102. The system 100 provides the video time points 114 for use by the user system 102. The video time points 114 are useable to instrument a video to advance playback to the video time points 114. Advancing video playback to one of the video time points 114 provides the user with a video portion that responds to the query 104. This is especially useful if the video includes content that is immaterial to the query 104 in addition to the content at one of the video time points 114 that is relevant to the query 104. As illustrated, the video time points 114 are points in a video timeline 116 of a video.

For purposes of demonstration, the system 100 is primarily described in a technical support context, but the system 100 is applicable to other contexts. In an implementation, the user system 102 generates the query. For example, a user has tried to establish a password that excludes a special character, and the password requirements include at least one special character. A user system 102 the user operates generates the query 104, "Why will the system not accept my password?". The query 104 is transmitted to a semantic video time point determiner 106. The semantic video time point determiner 106 receives the query 104 and determines a topic from the query 104. The semantic video time point determiner 106 determines one or more predefined categories associated with the topic. For example, the topic is "invalid password," and the associated categories include "password support." The "password support" category includes subcategories "password requirements," "what is a special character," or "how to change a password." While the categories, subcategories, and topics are presented here as strings of text for simplicity, in implementations, the categories, subcategories, or topics are representable in data as codes, vectors, or vector clusters. In implementations, the categories are categories of information predefined by a service.

In response to the semantic video time point determiner 106 determining that a category is semantically relevant to the topic of the query 104, the semantic video time point determiner 106 references a video metadata repository 108 to provide to the user system 102 in response to the query 104. The video metadata repository 108 includes category-based video metadata associated with any number of predefined categories of category-based video metadata. In an implementation, the category-based video metadata includes one or more time points associated with the categories determined to be addressed in videos. In implementations, the video metadata repository does not include the videos to which the category-based video metadata (e.g., video time points) refer. For example, the videos are sourceable from third-party video sources.

In an implementation, the category-based video metadata is generated prior to the query 104, but implementations are also contemplated in which the category-based video metadata is generated in response to the query 104. The generation of the category-based video metadata retrievable by semantic video time point determiner 106 is at least partially automated using artificial intelligence. In an implementation, the automation can be segmented into an automatic video categorization stage and an automatic video time point determination stage. In the automatic video categorization stage, the service uses an artificial intelligence-driven video categorizer configured to ingest video data representing the content of a video as input and responsively output one or more categories of information addressed in the video. The categories generated using artificial intelligence from the video data in the automatic video categorization stage are used in the automatic video time point determination stage. In the automatic video time point determination stage, a video time point determiner receives as inputs the video data and the one or more categories outputted from the video categorizer. The video time point determiner responsively outputs one or more of the video time points 114 associated with any of the one or more categories. Implementations are also contemplated in which the automated generation of category-based metadata is conducted by a unified categorical video point determiner in a single step.

Returning to the illustrated implementation, the category-based video metadata includes password support video metadata 110 and bad gateway support video metadata 112. Based on the topic that the semantic video time point determiner 106 determined from query 104, the semantic video time point determiner 106 determines that the "password support" category is the most semantically relevant category to the query 104. The semantic video time point determiner 106 then returns one of the video time points 114 or a page for the "password support" category in which the video time point is linked or presented. In an implementation, a support page for a category includes statically linked videos with statically predefined links to time points in the videos.

In implementations, a single video includes content associated with multiple categories. In these implementations, the video metadata repository includes more than one set of category-based video metadata for the video. For example, in the illustrated implementation, the password support video metadata 110 includes a first set of one or more video time points or other video metadata associated with the video, and the bad gateway support video metadata 112 includes a second set of one or more video time points or other video metadata associated with the video. Correspondingly, the video includes a first video time point at which the video discusses subject matter relevant to the password support category and a second video time point at which the video discusses subject matter relevant to the bad gateway support category.

In implementations, the system 100 is configured to request and/or receive feedback from a user to return a different time point in the same or a different video. In an implementation, the initially determined category and, hence, the initially determined implementation of the video time points 114 fail to address the query 104 to the satisfaction of the user. In this implementation, the user system 102 provides further feedback to determine another category or subcategory. The feedback can come in the form of a new query or an indication that the previous category was incorrect or too general. For example, in the technical support context, the password support category includes the subcategories "password requirements," "what is a special character," or "how to change a password." A video presented on a support page for the "password support" category provides general password support. The user system 102 selects a link to a time point in a general password support video on the "password support" category page. The link instruments the video to present the video advanced to one or more of the video time points 114 associated with the "password support" category.

In an implementation, the general "password support" page itself is insufficient to address the query 104 to the satisfaction of the user. For example, the user has watched three minutes of the video from the video time point provided and realizes that her inquiry has not been addressed. The user wants a more specific answer to the query 104 and fails to understand the meaning of the linked-to subcategory pages on the "password support" category page. The user system 102 provides feedback to the system 100 that the user wants a specific answer regarding why the password the user provided was invalid.

Based on the feedback from the user system 102, the semantic video time point determiner 106 modifies the topic and/or semantic determination of the category to identify the "password requirements" subcategory. The system 100 then returns a support page of the subcategory "requirements for a valid password" with a video time point in a video about requirements for a valid password. The user clicks a link to a "requirements for a valid password" video time point in the video and causes a site to instrument the video to advance the video to the video time point associated with the subcategory "requirements for a valid password."

The user mostly understands, but the user does not know what a special character is. The user system 102 responsively sends a query about the special characters or responds to a prompt from the semantic video time point determiner 106 for feedback regarding whether the "requirements for a valid password" subcategory support page answered the query 104. The user system 102 indicates in the query or feedback that the user does not know what a special character is. The semantic video time point determiner 106 responsively determines a topic of "special character" and semantically associates the topic with the subcategory "What is a special character?" The semantic video time point determiner 106 returns a video time point associated with the "What is a special character?" subcategory. The user clicks a presented link or video player that instruments a different video to start playback of a video at a video time point at which the video describes what a special character is. The user is satisfied and feels no need to bother a live customer support representative, reducing the burden on the service's live support resources.

In implementations, the categories are grouped into categorical domains that organize categories into categorical hierarchies. For example, "password support" and "login support" could be categories in a "user authentication" domain. In this example, the "password support" category includes subcategories inferior to the "password support" category in the hierarchy, such as "requirements for a valid password" and "what is a special character." Another example domain is a "connectivity" domain that includes a category of "bad gateway error."

In implementations, the descriptions and/or links for subcategories are presented on the same page as a superior category, and refined searches (e.g., based on feedback from the user) result in directing the user system to a position in the category page with information or links to video time points in videos about the subcategory. In implementations, rather than the feedback causing the semantic video time point determiner 106 to return a subcategory of a previously determined category, the semantic video time point determiner 106 returns a link or page with a video time point in the video (or a different video) for a different category. In implementations, the system 100 stores data representing prior queries and/or topics and determines subsequent results that consider the prior queries or topics in context. For example, rather than the semantic video time point determiner 106 relying merely on the updated query to determine the topic, the semantic video time point determiner 106 may determine a topic based on the prior topics and queries the user system 102 submitted. In implementations, the semantic video time point determiner 106 determines semantic associations between the topics and categories using inferential models, such as machine learning models, using similarity or proximity in vector spaces of vectors representing queries relative to topics or categories, or based on keyword or rule-based relationships. In other implementations, rather than determining a topic of the query 104 as an intermediary determination, the semantic search provides the categories directly based on the query using the semantic association between the query and the categories.

In an implementation, the semantic video time point determiner 106 is trained to provide a solution to the query 104 that is not directly semantically linked to the text of the query 104. For example, queries of the same type as the query 104 that end with the same result or solution are clustered, so the semantic video time point determiner 106 provides the desired solution to a user's issue when the issue is poorly expressed or not expressed at all in the query 104. In an implementation of the support context, the predefined categories include root causes of known problems that are expressed in queries. For example, the query 104 is "cannot connect to server." The semantic video time point determiner 106 determines the topic "server connectivity" from the query 104. The semantic video time point determiner 106 then determines a category "bad gateway" based on a predefined association between server connectivity problems and a gateway error as a root cause of the server connectivity problems. Using root causes as the categories for which video time points are generated provides more directed solutions to clients. For example, the user would potentially have to navigate between different connectivity pages to get to the root cause without the predefined association programmed in the semantic video time point determiner 106 between "server connectivity" and a "bad gateway."

The system 100 has been described with respect to a technical support context, but the system 100 is deployable in other contexts. For example, the system 100 is deployable in a travel services context. A travel agent posts pages for each potential destination for which the travel agent provides services. Each destination can be considered a category. Each category includes subcategories of services offered at the destination and/or alternative destinations people who have searched for that destination end up selecting. The user system 102 submits a query 104, "Trip to Mexico." The semantic video time point determiner 106 determines the query represents a category of "Mexico." The semantic video time point determiner 106 responsively provides a dynamic link to a video time point in a vacation video or a page associated with the category Mexico with a link to the video time point in the vacation video.

When the user system 102 provides feedback (e.g., responsive to the system 100 prompting the user for feedback) that indicates the user wants a hotel with massage services, the semantic video time point determiner 106 returns a link or page, including a link to or a presentation of a video time point in a video that describes the massage services at Mexican hotels. Alternatively, the user system 102 provides feedback indicating that Mexican vacations are too expensive and that the user would prefer a more affordable destination. The semantic video time point determiner 106 presents a page with a time-limited deal on trips to Guatemala and an associated video time point in a video that shows the beauty of Guatemala (e.g., based on other users searching for trips to Mexico selecting vacations to Guatemala).

Another example context is a service that presents concert videos to subscribers. For example, a category is a particular concert, and subcategories include each of the songs played, bass solos, guitar solos, collaborations with the opening band, and fireworks. The user system 102 transmits the query 104, "that Filthy Chipmunk concert at Grunge Venue in '92." The semantic video time point determiner 106 generates a topic from the query 104, "Filthy Chipmunks 92 Grunge Venue" and semantically associates the topic with the category "692 Filthy Chipmunks at Grunge Venue." The semantic video time point determiner 106 directs the user system to a page with a video of the entire concert starting at the beginning of the concert. The user system 102 provides a feedback query (e.g., in response to a prompt to advance to a time point in the concert) of "that one bass solo." In response to this, the semantic video time point determiner 106 determines a topic of "bass solo," which the semantic video time point determiner 106 semantically associates with the subcategory "bass solos." The semantic video time point determiner 106 returns a page with a link to multiple time points in the concert video with solos.

The user remembers there was a special bass solo in a song in which the Filthy Chipmunks invited the opening band, Why Cry Rivers, to play along. The user system 102 provides a feedback query, "bass solo with why cry rivers." The semantic video time point determiner 106 determines a topic of "bass solo why cry rivers," which the semantic video time point determiner 106 semantically associates with the subcategories "bass solos" and "collaborations with the opening band." The semantic video time point determiner 106 returns a link to a video time point common to both subcategories in which a member of the Filthy Chipmunks performed a bass solo during a collaborative performance with Why Cry Rivers. The user system 102 selects the returned link that instruments the concert video to advance playback to the bass solo in the collaborative performance. The examples of contexts in which the system 100 can be deployed are provided for the purpose of illustration. The system 100 can be deployed in any context in which videos include video time points that address categories of information.

In implementations, the category-based metadata includes annotation data usable to annotate the video time points. The annotations include a text string presentable on a page near a link, a video player, or within a video played in a video player. In implementations, the annotations are generated automatically based on the categories and/or video data. Implementations are also contemplated in which the annotations are manually generated by a service content writer.

Figure 2:
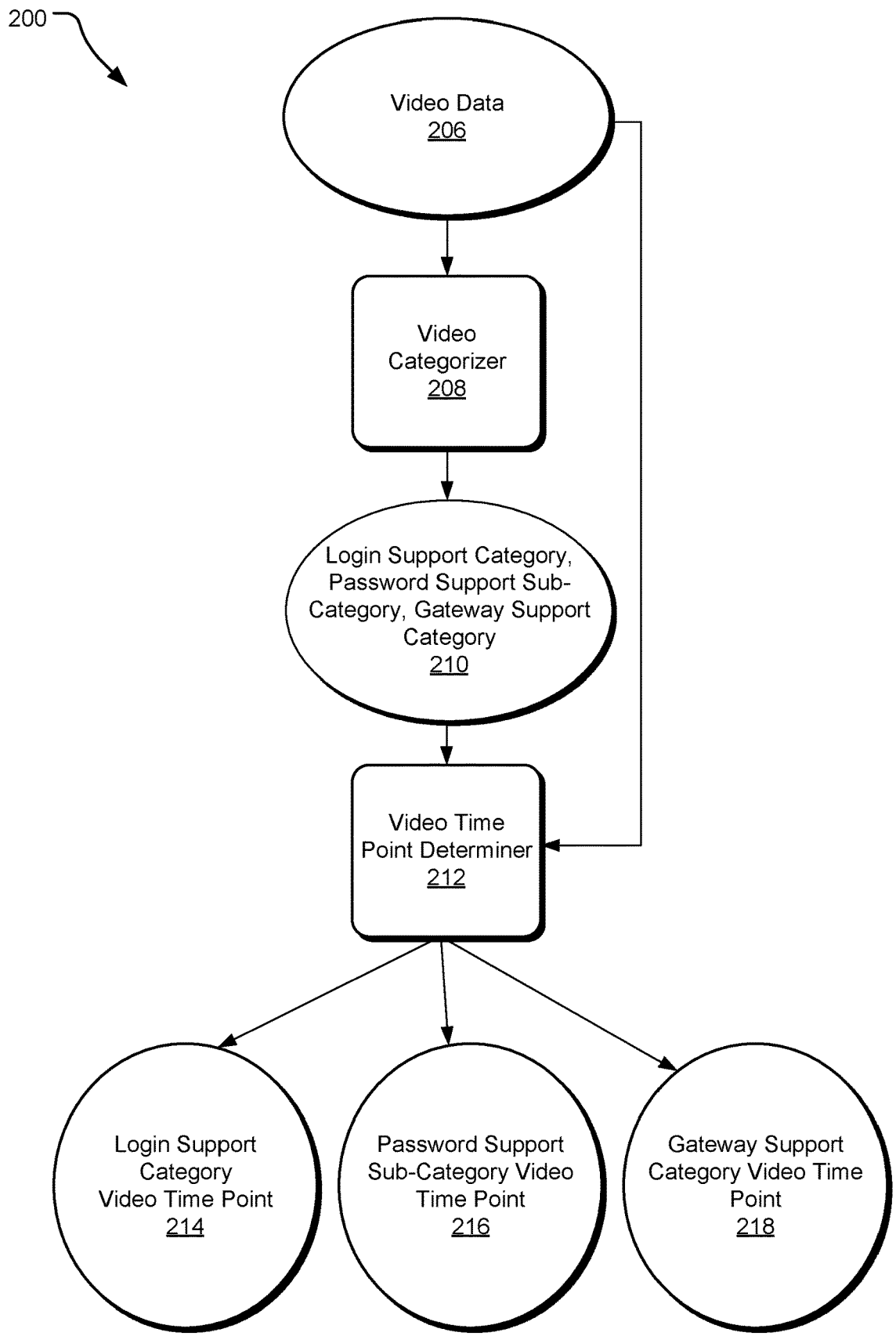
FIG. 2 illustrates an example system for determining categorically relevant time points in a video.

FIG. 2 illustrates an example system 200 for determining categorically relevant video time points in a video. The system 200 operates on video data 206 to determine the video time points. Examples of the video data 206 include video data (e.g., time-series pixel or compressed video data) processable to view the video, annotation data associated with the video data (e.g., presented titles in the video), data representing video content indexes, data representing video menus, data representing a transcript of the video, data representing transitions in the video (e.g., screen wipes or black screens), or video metadata (e.g., titles or descriptions/synopses provided by the video provider).

The generation of the category-based video metadata is at least partially automated, leveraging artificial intelligence. In an implementation, the automation can be segmented into an automatic video categorization stage and an automatic video time point determination stage.

In the automatic video categorization stage, the service uses a video categorizer 208. The video categorizer 208 is configured to use artificial intelligence to ingest the video data 206 as input and responsively output the video categories 210. In the illustrated implementation, the video categories 210 include a login support category, a password support subcategory (of the login support category), and a gateway support category. The video categorizer 208 is an inferential model configured to receive video data and output categories represented in the video. In an implementation, the video categorizer 208 is an artificial intelligence machine learning model trained using historical use training data as input rather than the video data used as input at inference time. For example, the historical use training data is labeled with predefined categories defined by a service, and the machine learning model is trained to output the labeled categories in response to the input of the historical use training data during training. An implementation of the training is described with respect to FIG. 3.

In an implementation, the historical use training data includes data other than data representing the content of a video that a service provides (e.g., directly or by a linked address) to users. That is, the historical use training data is extrinsic to data representing the content of a video (a transcript, pixel values, compressed video data, or metadata of the video).

In an implementation, the historical use training data includes data that represents a user's interaction with the service. In the previously discussed support context, the historical use training data includes data representing previous solutions provided by the service to problems of the users. For example, the historical use training data includes transcripts or notes from customer interactions with live support staff. An example of historical use training data in the previously discussed travel agent context is a record of an initial request for a destination of a user and the destination eventually chosen. An example of historical use training data in the previously discussed concert video service context is comments provided relative to concert videos in the past. The historical use training data can also be labeled as belonging to a particular category. For example, in an implementation, each category is a root cause of a problem that is used as a ground truth label for data representing a customer service interaction that addresses a customer's problem.

A video time point determiner 212 is configured to determine video time points in a video relevant to categories. The video time point determiner 212 takes as input the video data 206 and the video categories 210 and responsively outputs video time points associated with the video categories. In the illustrated example, the video time point determiner 212 outputs category-based video metadata with video time points and associated categories. In the illustrated example, the output category-based metadata includes a login support category video time point 214, a password support subcategory video time point 216, and a gateway support category video time point 218.

Implementations are also contemplated in which a unified categorical video point determiner simultaneously generates video time points and associations with predefined categories without a separate video categorization stage. For example, the unified categorical video point determiner takes in video data representing the content of a video and outputs category-based video metadata, including data representing a video time point and data representing a predefined category associated with the video time point.

A service provider can use the artificial intelligence of the system 200 to provide time points in videos associated with categories to users. For example, as illustrated with respect to the technical support context, an author of a technical support page for a service can provide the login support category video time point 214, the password support subcategory video time point 216, and the gateway support category video time point 218 on support pages for the associated categories. When a user clicks on the link to one of the video time points, the linked-to video is instrumented to advance to the video time point in the video associated with the category. This provides the user with a relevant portion in a video to address a query semantically associated with a category associated with the video time point in the video. In implementations, the login support category video time point 214, the password support subcategory video time point 216, and the gateway support category video time point 218 are saved as category-based video metadata to a video metadata repository as video metadata associated in memory with the video and with the determined corresponding category. A semantic video time point determiner is configured to retrieve the video time points from the video metadata repository to be provided as category-based video metadata in response to user queries, as described herein. In implementations, the semantic video time point determiner 106 retrieves a support page that includes or is linked to category-based video metadata, including the time points in the video metadata repository.

Figure 3:
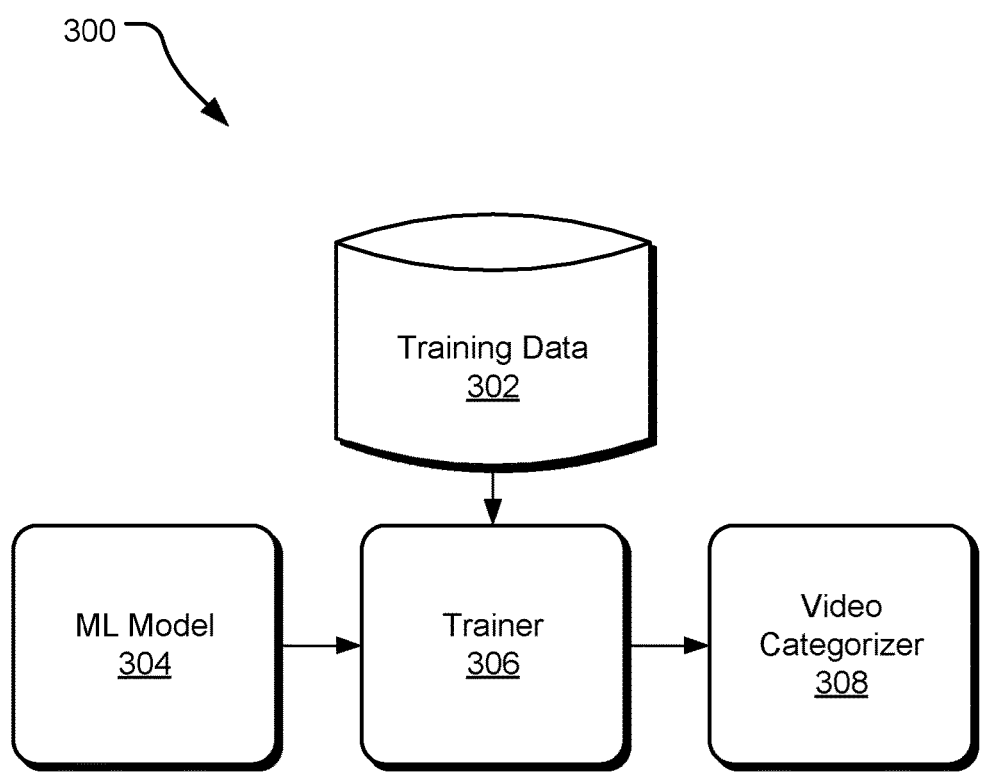
FIG. 3 illustrates an example system for training a video categorizer.

FIG. 3 illustrates an example system 300 for training a video categorizer 308. The system 300 provides a machine learning model 304 (or another inferential model) as a template with untrained weights for training. A trainer 306 trains the machine learning model 304 using training data 302 to generate the video categorizer 308.

The training data 302 includes historical use training data. In implementations, the historical use training data includes data representing historical interactions between a user and a service provided by a service provider. Historical use training data includes data that is other than data representing the content of a video that a service provides to a user. That is, the historical use training data is extrinsic to data representing the content of the video (e.g., a transcript, pixel values, or compressed video data) and/or data usable by a computing system to reference the video (e.g., metadata of the video). For example, the historical use training data can include data representing how other users have interacted with problems or solutions associated with categories predefined by a service. In this way, the trainer 306 trains the machine learning model 304 using historical use training data other than data representing or referencing the content of videos as input to yield output a trainer uses to compare with ground truth labels of predefined categories. However, in use at inference time, the video categorizer 308 receives as input intrinsic video data that represents and/or refers to the content of a video to responsively output the predefined categories the video categorizer 308 determines, using artificial intelligence, are represented in the video data. The types of data input into the machine learning model at training time differ from the type of video data input into the machine learning model for determining categories represented in video data at inference time. Implementations are contemplated in which the machine learning model 304 is also trained using labeled intrinsic video data in addition to the historical use training data.

In training, the categories are the target ground truth labels of the historical use training data the trainer 306 uses to train the machine learning model 304. In an implementation in the customer support context, the historical use training data includes customer support data describing or addressing a problem. Examples of historical use training data include transcripts of calls between customers and customer support representatives, notes from customer support representatives about client interactions, frequently asked question data, or previously authored support text. Each of the instances of the historical use training data is labeled with a ground truth category for a type of problem being addressed. Implementations are contemplated in which the support interactions are conducted by video conferencing, and the historical use training data includes video data of the conference. Any historical use video training data is distinguishable from the type of video data that a service would categorize with a video categorizer 308 at inference time. The type of video the video categorizer 308 categorizes is one to be provided to users as part of a service.

In an implementation, each category represents a root cause of one or more problems. Sometimes a single root cause can manifest as a number of different problems that are difficult for users to address without support. In this implementation, the training data 302 provides an inferential association between a user's query describing a problem and the root cause of the problem to train the machine learning model 304 to determine the root cause of a problem as expressed in a user query and operate as the video categorizer 308.

In other contexts, the historical use training data is different. For example, in the previously discussed travel agent context, the historical use training data can include previous transcripts or notes from the interactions with customers for planning the trips. Examples of contents of the notes or transcripts include destinations chosen, budget considerations of clients, destinations considered by clients as alternatives to a requested destination, and services clients requested at the destinations. Based on this, examples of categories the trainer 306 uses as ground truth labels corresponding to samples of the historical use training data for training the machine learning model 304 include destinations, types of packages, services offered, or relevant alternative destinations. Implementations are also contemplated in which the trainer uses intrinsic evidence, such as portions of travel videos that influenced different clients to choose travel destinations or travel services.

In the previously discussed context of a service that provides concert videos, the historical use training data could include comments provided by users in relation to concert videos in the past, requests from clients for a particular type of time point, known songs of a band playing in a concert video (e.g., lyrics or audio of the songs from a different source), or excerpts of a concert video that highlight particular aspects or that are already annotated.

In the illustrated implementation, the trainer 306 introduces the historical use training data into the machine learning model 304 and compares the output of the machine learning model 304 with the associated labeled ground truth categories. Based on the comparison, the trainer 306 determines a loss and then backpropagates the loss through weights of the machine learning model 304. This is an example of supervised learning, but other training methods are contemplated. The training is continued (e.g., using the training data 302 over a number of iterations and epochs) until the trainer 306 determines that the determined loss satisfies a convergence condition. Examples of a convergence condition include or are based on a threshold value of loss or number of incorrect inferences for category selection. The convergence condition may also include a threshold of acceptable losses or incorrect inferences when inputting a labeled validation data set. The training session ends with the satisfaction of a convergence condition, which effectively generates the video categorizer 308 from the machine learning model 304.

Implementations are also contemplated in which a unified categorical video time point determiner, as an alternative to the video categorizer 308, simultaneously generates video time points and associations with predefined categories without a separate video categorization stage. For example, the categorical video point determiner takes in video data representing the content of a video and outputs category-based video metadata, including data representing a video time point and data representing a predefined category associated with the video time point. In these implementations, the trainer 306 trains the unified categorical video time point determiner using the historical use training data and video data representing the content of a video predetermined to be related to the historical use training data. In this implementation, the historical use training data and related video data would be labeled with ground truth data, including video time points and associated predefined categories. The trainer 306 trains the machine learning model 304 to generate the unified categorical video time point determiner by inputting the historical use training data and related video data into the machine learning model 304, comparing the output of the machine learning model 304 with the ground truth data, determining a loss based on the comparison, and repeating until a convergence condition is satisfied. This is an example of supervised learning, but other training methods are contemplated.

Examples of the machine learning model 304 or alternative inferential models the trainer 306 trains to generate the video categorizer 308 or the unified categorical video time point determiner include, without limitation, rule-based models, data mining algorithms, artificial intelligence algorithms, masked learning models, natural language processing models, neural networks, artificial neural networks, perceptrons, feed-forward networks, radial basis neural networks, deep feed-forward neural networks, recurrent neural networks, long/short term memory networks, gated recurrent neural networks, autoencoders, variational autoencoders, denoising autoencoders, sparse autoencoders, Bayesian networks, regression models, decision trees, Markov chains, Hopfield networks, Boltzmann machines, restricted Boltzmann machines, deep belief networks, deep convolutional networks, genetic algorithms, deconvolutional neural networks, deep convolutional inverse graphics networks, generative adversarial networks, liquid state machines, extreme learning machines, echo state networks, deep residual networks, Kohonen networks, support vector machines, federated learning models, or neural Turing machines. In implementations, the trainer 306 trains the machine learning model 304 to generate the video categorizer 308 by an inferential model training method. In this specification, examples of training methods (e.g., inferential and/or machine learning methods) can include, without limitation, one or more of masked learning modeling, unsupervised learning, supervised learning (as described), reinforcement learning, self-learning, feature learning, sparse dictionary learning, anomaly detection, robot learning, association rule learning, manifold learning, dimensionality reduction, bidirectional transformation, unidirectional transformation, gradient descent, autoregression, autoencoding, permutation language modeling, two-stream self attenuation, or federated learning. Alternatively, for rule-based models, the rules are established based on predefined relationships set by a manufacturer or developer.

Figure 4:
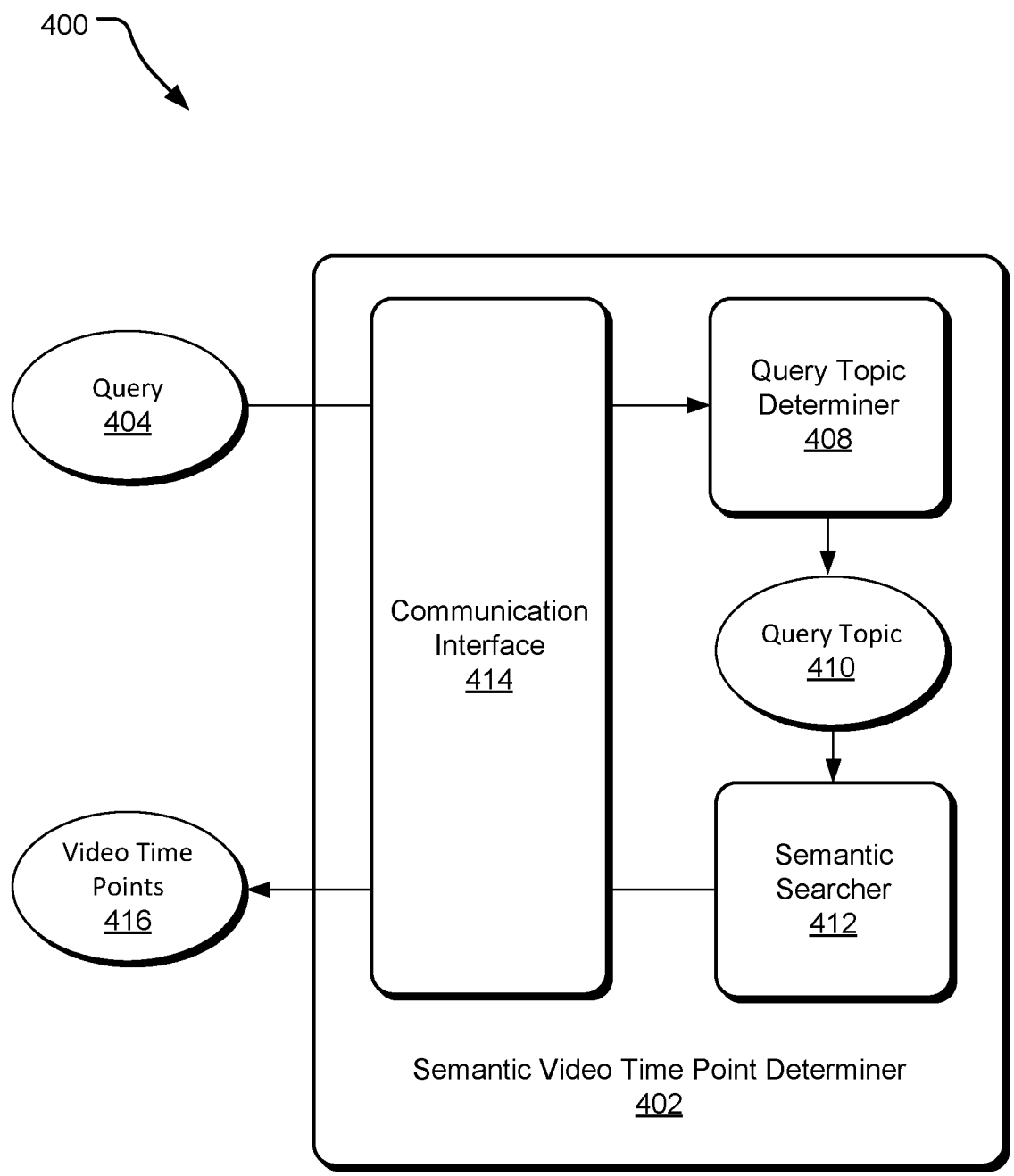
FIG. 4 illustrates an example system for providing a video time point to address a query.

FIG. 4 illustrates an example system 400 for providing video time points 416 to address a query 404. The system 400 includes a semantic video time point determiner 402. The semantic video time point determiner 402 includes a communication interface 414 configured to provide the query 404 to a query topic determiner 408. The query topic determiner 408 is configured to determine a query topic 410 based on the query 404. For example, the query topic determiner 408 is configured to extract keywords from or tokenize the query 404 to generate the query topic 410. In an implementation, the query topic determiner recognizes sentiment directed toward keywords or other words. For an example of the query 404, "forgot password and have invalid email," the topic can include an explicit exemption for retrieving a password using an email address. An example of the query topic 410 that the query topic determiner 408 determines based on the example of the query is "forgot password, no email."

The query topic 410 is introduced to a semantic searcher 412. The semantic searcher 412 searches for categories semantically relevant to or associated with the query topic 410. For example, the semantic searcher 412 determines categories that are associated the query topic 410. For example, for the query topic 410, the semantic searcher determines categories "reset your password with a phone number" and "reset your password by calling a representative." The semantic searcher 412 selects the category "reset your password with a phone number" to provide a solution that does not require the use of live support. The semantic searcher 412 searches a video metadata repository for the video time points 416 or a support page with the video time points 416 associated with the category "reset your password with a phone number." The semantic video time point determiner 402 returns the video time points 416 or the page containing the video time points 416.

Figure 5:
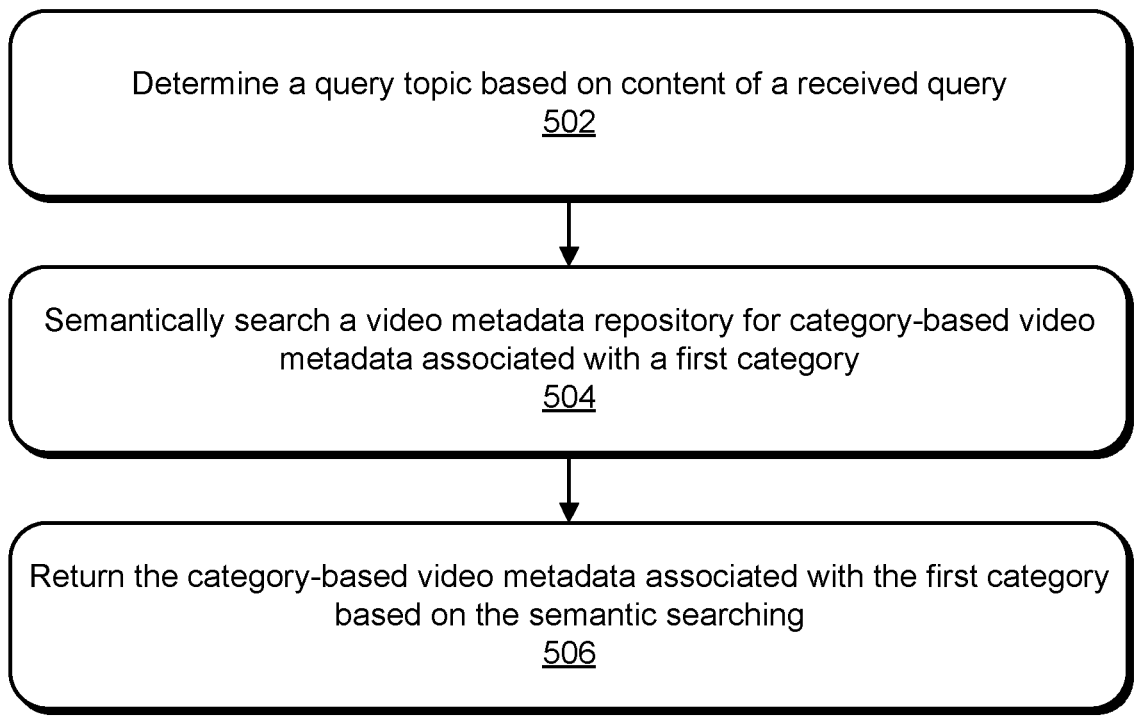
FIG. 5 illustrates example operations for instrumenting a video.

FIG. 5 illustrates example operations 500 for instrumenting a video. A determining operation 502 determines a query topic based on the content of a received query, as described herein.

A semantic searching operation 504 semantically searches a video metadata repository for category-based video metadata associated with a first category. The first category is semantically associated with the query topic. The first category is one of a plurality of categories that a machine learning model (e.g., a video categorizer) is configured to output responsive to input of video data representing video content using artificial intelligence. The machine learning model was trained based on inputting training data, including historical use training data associated with each of the plurality of categories, into the machine learning model, as described herein. The historical use training data includes data other than data representing video content. In an implementation, the data other than data representing video content of a video is data other than data representing video of a type a service would provide to a user and/or includes data representing a historical interaction between a user and a service provided by a service provider.

In an implementation, the category-based video metadata is associated in a video metadata repository with a video and the first category. For example, the category-based video metadata associated with the first category includes data representing a time point in the video determined by a video time point determiner based on the first category and video data representing the content of the video. In this implementation, the category-based video metadata associated with the first category was generated by a video time point determiner based on the output of the first category from a machine learning model. The machine learning model outputted the first category responsive to the input of the video data representing the content of the video into the machine learning model. In an implementation, the category-based video metadata associated with the first category includes an annotation associated with the first category. The annotation is presentable in association with the time point in the video.

A returning operation 506 returns the category-based video metadata associated with the first category based on the semantic searching.

In implementations, when a user is unsatisfied with the category-based video metadata that the returning operation 506 returned, the operations 500 include a further search for different category-based metadata. For example, the information was too broad to address a user's specific issue. Implementations are contemplated in which the operations 500 further include a second semantic searching operation (not illustrated) that semantically searches the video metadata repository for category-based video metadata associated with a second category based on the received query and feedback received responsive to the returned category-based video metadata. In these implementations, the operations 500 optionally include a second returning operation (not illustrated) that returns the category-based video metadata associated with the second category. In an implementation, the first category and the second category are identified in memory as belonging to a categorical domain of a plurality of categorial domains.

The operations 500 are applicable in a number of contexts. For example, in an implementation of a support context, the received query includes a support query for technical support to address a technical problem. The query topic includes the technical problem. The first category includes a root cause of the technical problem determined based on the query topic. The historical use training data includes data representing an interaction between support personnel of a service and a user of the service. The data representing the interaction includes the root cause and the technical problem predetermined to be resolvable by addressing the root cause.

In an implementation, the video metadata repository includes a plurality of category-based video metadata sets associated with each of a plurality of videos based on the plurality of categories. In this implementation, the category-based video metadata associated with a first category is one of the plurality of category-based video metadata sets, as described herein.

Figure 6:
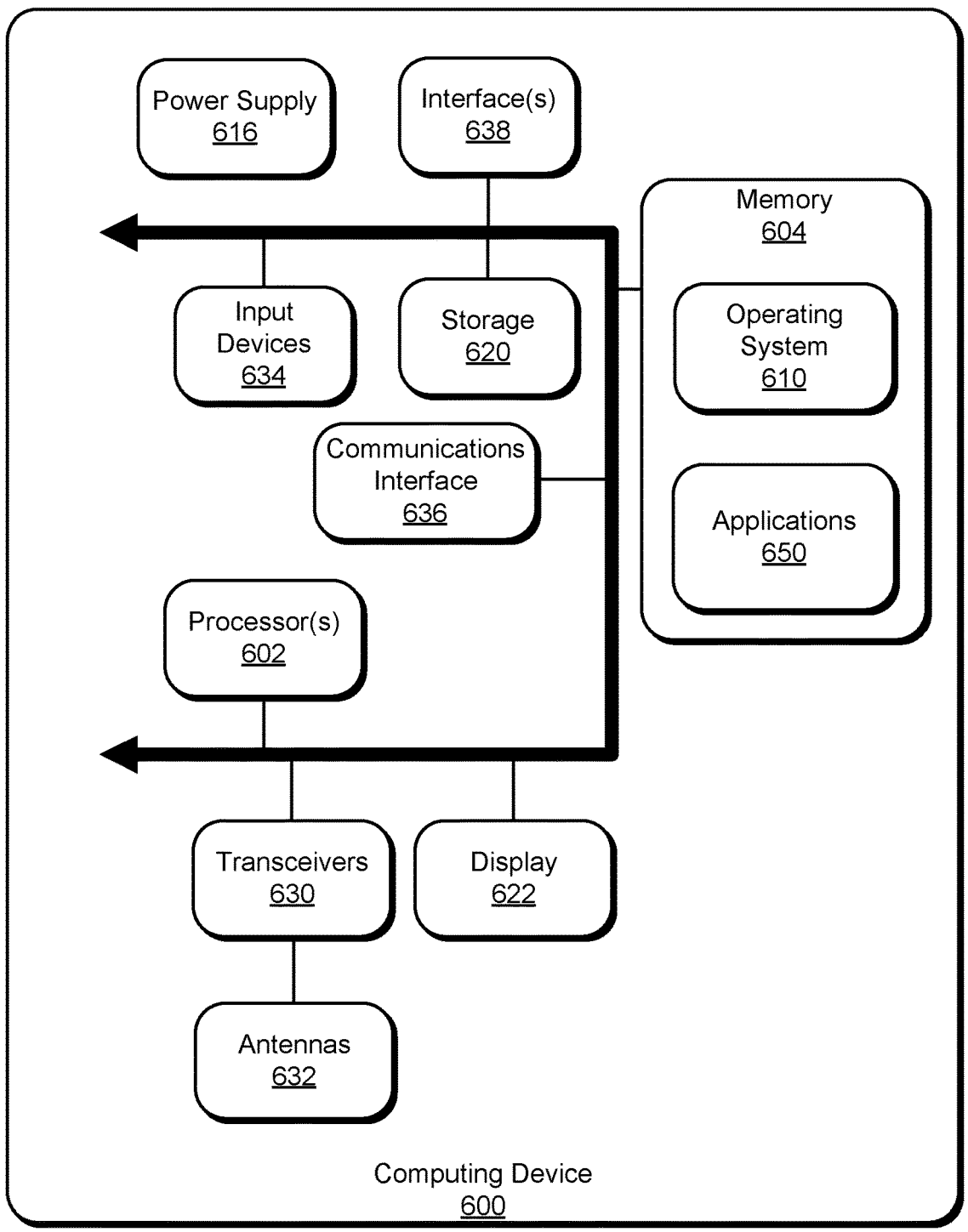
FIG. 6 illustrates an example computing device for use in implementing the described technology.

FIG. 6 illustrates an example computing device 600 for use in implementing the described technology. The computing device 600 may be a client computing device (such as a laptop computer, a desktop computer, or a tablet computer), a server/cloud computing device, an Internet-of-Things (IoT), any other type of computing device, or a combination of these options. The computing device 600 includes one or more processor(s) 602 and a memory 604. The memory 604 generally includes both volatile memory (e.g., RAM) and nonvolatile memory (e.g., flash memory), although one or the other type of memory may be omitted. An operating system 610 resides in the memory 604 and is executed by the processor(s) 602. In some implementations, the computing device 600 includes and/or is communicatively coupled to storage 620.

In the example computing device 600, as shown in FIG. 6, one or more modules or segments, such as applications 650, a semantic video time point determiner, a video categorizer, an inferential model, a video time point determiner, an inferential model trainer, a query topic determiner, a semantic searcher, and other program code and modules are loaded into the operating system 610 on the memory 604 and/or the storage 620 and executed by the processor(s) 602. The storage 620 may store a video time point, a query, a query topic, a category, category-based video metadata, video data (e.g., representing content of the video), historic use training data, and other data and be local to the computing device 600 or may be remote and communicatively connected to the computing device 600. In particular, in one implementation, components of a system for instrumenting a video, including a query topic determiner configured to determine a query topic based on content of a received query and a semantic searcher configured to semantically search a video metadata repository for category-based video metadata associated with a first category may be implemented entirely in hardware or in a combination of hardware circuitry and software.

The computing device 600 includes a power supply 616, which may include or be connected to one or more batteries or other power sources, and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers, client devices, IoT devices, and other computing and communications devices. The computing device 600 may further include a communications interface 636 (such as a network adapter or an I/O port, which are types of communication devices). The computing device 600 may use the adapter and any other types of communication devices for establishing connections over a wide-area network (WAN) or local-area network (LAN). It should be appreciated that the network connections shown are exemplary and that other communications devices and means for establishing a communications link between the computing device 600 and other devices may be used.

The computing device 600 may include one or more input devices 634 such that a user may enter commands and information (e.g., a keyboard, trackpad, or mouse). These and other input devices may be coupled to the server by one or more interfaces 638, such as a serial port interface, parallel port, or universal serial bus (USB). Other interfaces may include a sensor or an actuator. The actuator may be configured to move responsive to the sensors (e.g., in a feedback loop) and may be used to execute any operations described herein. The computing device 600 may further include a display 622, such as a touchscreen display.

The computing device 600 may include a variety of tangible processor-readable storage media and intangible processor-readable communication signals. Tangible processor-readable storage can be embodied by any available media that can be accessed by the computing device 600 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of instrumenting a video, comprising: determining a query topic based on content of a received query; semantically searching a video metadata repository for category-based video metadata associated with a first category, the first category being semantically associated with the query topic and being one of a plurality of categories that a machine learning model is configured to output responsive to input of video data representing video content, wherein the machine learning model was trained based on inputting training data including historical use training data associated with each of the plurality of categories into the machine learning model; and returning the category-based video metadata associated with the first category based on the semantic searching.

Clause 2. The method of clause 1, wherein the category-based video metadata associated with the first category is associated with a video, and wherein the category-based video metadata associated with the first category was generated based on the machine learning model outputting the first category responsive to input of video data representing content of the video into the machine learning model.

Clause 3. The method of clause 2, wherein the category-based video metadata associated with the first category includes data representing a time point in the video determined by a video time point determiner based on the first category and the video.

Clause 4. The method of clause 1, wherein the historical use training data includes data other than data representing video content.

Clause 5. The method of clause 4, wherein the data other than data representing video content includes data representing a historical interaction between a user and a service provided by a service provider.

Clause 6. The method of clause 1, further comprising: semantically searching the video metadata repository, based on the received query and feedback received responsive to the returned category-based video metadata associated with the first category, for category-based video metadata associated with a second category of the plurality of categories; and returning the category-based video metadata associated with the second category, wherein the first category and the second category are identified in memory as belonging to a categorical domain of a plurality of categorial domains.

Clause 7. The method of clause 1, wherein the received query includes a support query for technical support to address a technical problem, the query topic includes the technical problem, the first category includes a root cause of the technical problem determined based on the query topic, and the historical use training data includes data representing an interaction between support personnel of a service and a user of the service.

Clause 8. The method of clause 1, wherein the video metadata repository includes a plurality of category-based video metadata sets including a first category-based video metadata set associated with a video and the first category and a second category-based video metadata set associated with the video and a second category.

Clause 9. A system for instrumenting a video, comprising: one or more hardware processors; a query topic determiner executable by the one or more hardware processors and configured to determine a query topic based on content of a received query; a semantic searcher executable by the one or more hardware processors and configured to semantically search a video metadata repository for category-based video metadata associated with a first category, the first category being semantically associated with the query topic and being one of a plurality of categories that a machine learning model is configured to output responsive to input of video data representing content of a plurality of videos, wherein the video metadata repository includes a plurality of video metadata sets for each of the plurality of videos referred to in the category-based video metadata, wherein the machine learning model was trained using historical use training data associated with the first category as input; and a communication interface configured to return the category-based video metadata associated with the first category based on the semantic searching.

Clause 10. The system of clause 9, wherein the category-based video metadata associated with the first category is associated with a video, and wherein the category-based video metadata associated with the first category was generated based on the machine learning model outputting the first category responsive to input of video data representing content of the video into the machine learning model.

Clause 11. The system of clause 9, the semantic searcher further configured to: semantically searching the video metadata repository, based on the received query and feedback received responsive to the returned category-based video metadata associated with the first category, for category-based video metadata associated with a second category of the plurality of categories, wherein the communication interface is further configured to return the category-based video metadata associated with the second category.

Clause 12. The system of clause 9, wherein the video metadata repository includes a plurality of category-based video metadata sets including a first category-based video metadata set associated with a video and the first category and a second category-based video metadata set associated with the video and a second category.

Clause 13. The system of clause 9, wherein the category-based video metadata associated with the first category includes data representing a time point in the video determined by a video time point determiner based on the first category.

Clause 14. The system of clause 9, wherein the received query includes a support query for technical support to address a technical problem, the query topic includes the technical problem, the first category includes a root cause of the technical problem determined based on the query topic, and the historical use training data includes the root cause and data representing the technical problem.

Clause 15. One or more tangible processor-readable storage media embodied with instructions for executing on one or more processors and circuits of a computing device a process of instrumenting a video, the process comprising: determining a query topic based on content of a received query; semantically searching a video metadata repository for category-based video metadata associated with a first category, the first category being one of a plurality of categories that a machine learning model is configured to output and being semantically associated with the query topic, wherein the video metadata repository includes a plurality of video metadata sets for each of a plurality of videos including a video referred to in the category-based video metadata associated with the first category, wherein the machine learning model was trained to output the first category based on training data including historical use training data associated with the first category; and returning the category-based video metadata associated with the first category based on the semantic searching.

Clause 16. The one or more tangible processor-readable storage media of clause 15, wherein the category-based video metadata is associated with a video, and wherein the category-based video metadata was generated based on the first category determined by the machine learning model responsive to input of video data representing the video referred to in the category-based video metadata into the machine learning model.

Clause 17. The one or more tangible processor-readable storage media of clause 15, the process further comprising: semantically searching the video metadata repository, based on the received query and feedback received responsive to the returned category-based video metadata associated with the first category, for category-based video metadata associated with a second category of the plurality of categories; and returning the category-based video metadata associated with the second category.

Clause 18. The one or more tangible processor-readable storage media of clause 17, wherein the first category and the second category are identified in memory as belonging to a categorical domain of a plurality of categorial domains and wherein the second category is a subcategory of the first category in a hierarchy within the categorical domain.

Clause 19. The one or more tangible processor-readable storage media of clause 15, wherein the category-based video metadata associated with the first category includes data representing a time point in the video determined by a video time point determiner based on the first category and the video.

Clause 20. The one or more tangible processor-readable storage media of clause 15, wherein the video metadata repository includes a plurality of category-based video metadata sets including a first category-based video metadata set associated with a video and the first category and a second category-based video metadata set associated with the video and a second category.

An example system for instrumenting a video is provided, including means for determining a query topic based on content of a received query; means for semantically searching a video metadata repository for category-based video metadata associated with a first category, the first category being semantically associated with the query topic and being one of a plurality of categories that a machine learning model is configured to output responsive to input of video data representing video content, wherein the machine learning model was trained based on inputting training data including historical use training data associated with each of the plurality of categories into the machine learning model; and means for returning the category-based video metadata associated with the first category based on the semantic searching.

Another example system of any disclosed system is provided, wherein the category-based video metadata associated with the first category is associated with a video, and wherein the category-based video metadata associated with the first category was generated based on the machine learning model outputting the first category responsive to input of video data representing content of the video into the machine learning model.

Another example system of any disclosed system is provided, wherein the category-based video metadata associated with the first category includes data representing a time point in the video determined by a video time point determiner based on the first category and the video.

Another example system of any disclosed system is provided, wherein the historical use training data includes data other than data representing video content.

Another example system of any disclosed system is provided, wherein the data other than data representing video content includes data representing a historical interaction between a user and a service provided by a service provider.

Another example system of any disclosed system is provided, further including means for semantically searching the video metadata repository, based on the received query and feedback received responsive to the returned category-based video metadata associated with the first category, for category-based video metadata associated with a second category of the plurality of categories; and means for returning the category-based video metadata associated with the second category, wherein the first category and the second category are identified in memory as belonging to a categorical domain of a plurality of categorial domains.

Another example system of any disclosed system is provided, wherein the received query includes a support query for technical support to address a technical problem, the query topic includes the technical problem, the first category includes a root cause of the technical problem determined based on the query topic, and the historical use training data includes data representing an interaction between support personnel of a service and a user of the service.

Another example system of any disclosed system is provided, wherein the video metadata repository includes a plurality of category-based video metadata sets including a first category-based video metadata set associated with a video and the first category and a second category-based video metadata set associated with the video and a second category.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein may be implemented as logical steps in one or more computer systems. The logical operations may be implemented (1) as a sequence of processor-implemented steps executing in one or more computer systems or (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination. Other implementations are within the scope of the following claims. Nevertheless, it will be understood that various modifications can be made without departing from the spirit and scope of the recited claims.

What is claimed is:

1. A method of instrumenting a video, comprising:
   determining a query topic based on content of a received query;
   determining a first category semantically related to the query topic;
   searching a video metadata repository for category-based video metadata corresponding to the first category, the first category being one of a plurality of categories that a machine learning model is configured to output responsive to input of video data, wherein the machine learning model was trained based on inputting training data including historical use training data corresponding to each of the plurality of categories into the machine learning model, the historical use training data including data extrinsic to the video content; and
   returning the category-based video metadata associated with the first category based on the searching.

2. The method of claim 1, wherein the category-based video metadata corresponding to the first category is associated with a video, and wherein the category-based video metadata corresponding to the first category was generated based on the machine learning model outputting the first category responsive to input of video data representing content of the video into the machine learning model.

3. The method of claim 2, wherein the category-based video metadata corresponding to the first category includes data representing a time point in the video determined by a video time point determiner based on the first category and the video.

4. The method of claim 1, wherein the data other than data representing video content includes data representing a historical interaction between a user and a service provided by a service provider.

5. The method of claim 1, further comprising:
   searching the video metadata repository, based on the received query and feedback received responsive to the returned category-based video metadata corresponding to the first category, for category-based video metadata corresponding to a second category of the plurality of categories; and
   returning the category-based video metadata corresponding to the second category, wherein the first category and the second category are identified in memory as belonging to a categorical domain of a plurality of categorial domains.

6. The method of claim 1, wherein the received query includes a support query for technical support to address a technical problem, the query topic includes the technical problem, the first category includes a root cause of the technical problem determined based on the query topic, and the historical use training data includes data representing an interaction between support personnel of a service and a user of the service.

7. The method of claim 1, wherein the video metadata repository includes a plurality of category-based video metadata sets including a first category-based video metadata set corresponding to a video and the first category and a second category-based video metadata set corresponding to the video and a second category.

8. A system for instrumenting a video, comprising:
   one or more hardware processors;
   a query topic determiner executable by the one or more hardware processors and configured to determine a query topic based on content of a received query;
   a semantic searcher executable by the one or more hardware processors and configured to:
      determine a first category semantically related to the query topic; and
      search a video metadata repository for category-based video metadata corresponding to a first category, the first category being one of a plurality of categories that a machine learning model is configured to output responsive to input of video data representing content of a plurality of videos, wherein the video metadata repository includes metadata sets for each of the plurality of videos referred to in the category-based video metadata, wherein the machine learning model was trained using historical use training data corresponding to the first category as input, the historical use training data including data extrinsic to the video content; and a communication interface configured to return the category-based video metadata corresponding to the first category based on the semantic searching.

9. The system of claim 8, wherein the category-based video metadata corresponding to the first category is associated with a video, and wherein the category-based video metadata corresponding to the first category was generated based on the machine learning model outputting the first category responsive to input of video data representing content of the video into the machine learning model.

10. The system of claim 8, the semantic searcher further configured to:

search the video metadata repository, based on the received query and feedback received responsive to the returned category-based video metadata corresponding to the first category, for category-based video metadata corresponding to a second category of the plurality of categories, wherein the communication interface is further configured to return the category-based video metadata corresponding to the second category.

11. The system of claim 8, wherein the video metadata repository includes a plurality of category-based video metadata sets including a first category-based video metadata set corresponding to a video and the first category and a second category-based video metadata set corresponding to the video and a second category.

12. The system of claim 8, wherein the category-based video metadata corresponding to the first category includes data representing a time point in the video determined by a video time point determiner based on the first category.

13. The system of claim 8, wherein the received query includes a support query for technical support to address a technical problem, the query topic includes the technical problem, the first category includes a root cause of the technical problem determined based on the query topic, and the historical use training data includes the root cause and data representing the technical problem.

14. One or more tangible processor-readable storage media embodied with instructions for executing on one or more processors and circuits of a computing device a process of instrumenting a video, the process comprising:

determining a query topic based on content of a received query;

determining a first category semantically related to the query topic;

searching a video metadata repository for category-based video metadata corresponding to a first category, the first category being one of a plurality of categories that a machine learning model is configured to output, wherein the video metadata repository includes a plurality of video metadata sets for each of a plurality of videos including a video referred to in the category-based video metadata corresponding to the first category, wherein the machine learning model was trained to output the first category based on training data including historical use training data corresponding to the first category, the historical use training data including data extrinsic to the video content; and returning the category-based video metadata corresponding to the first category based on the searching.

15. The one or more tangible processor-readable storage media of claim 14, wherein the category-based video metadata is associated with a video, and wherein the category-based video metadata was generated based on the first category determined by the machine learning model responsive to input of video data representing the video referred to in the category-based video metadata into the machine learning model.

16. The one or more tangible processor-readable storage media of claim 14, the process further comprising:

searching the video metadata repository, based on the received query and feedback received responsive to the returned category-based video metadata corresponding to the first category, for category-based video metadata corresponding to a second category of the plurality of categories; and returning the category-based video metadata corresponding to the second category.

17. The one or more tangible processor-readable storage media of claim 16, wherein the first category and the second category are identified in memory as belonging to a categorical domain of a plurality of categorial domains and wherein the second category is a subcategory of the first category in a hierarchy within the categorical domain.

18. The one or more tangible processor-readable storage media of claim 14, wherein the category-based video metadata corresponding to the first category includes data representing a time point in the video determined by a video time point determiner based on the first category and the video.

19. The one or more tangible processor-readable storage media of claim 14, wherein the video metadata repository includes a plurality of category-based video metadata sets including a first category-based video metadata set corresponding to a video and the first category and a second category-based video metadata set corresponding to the video and a second category.

20. The method of claim 1, wherein the category-based video metadata associated with the first category includes a time point corresponding to a portion of the video.

21. The method of claim 1, wherein determining the first category semantically related to the query topic includes determining the first category by applying an inferential model to the query topic.

22. The method of claim 1, wherein determining the first category semantically related to the query topic includes:

representing the query topic with a query vector; and determining the first category from a set of candidate categories represented by candidate category vectors, the first category being a candidate category of the candidate categories that is represented by a candidate category vector of the candidate category vectors having a greatest similarity to the query vector.

\* \* \* \* \*